United States Patent Office 3,565,952
Patented Feb. 23, 1971

3,565,952
4 - CHLORO - 3 - NITRO - 5 - SULFAMYL SALI-
CYLIC ACID - (2',6' - DIMETHYL) - ANILIDE
AND ITS SALTS
Walter Liebenow, Hamburg, Germany, assignor to
Beiersdorf AG, a corporation of Germany
No Drawing. Filed Sept. 6, 1968, Ser. No. 758,098
Int. Cl. C07c 143/78
U.S. Cl. 260—556                                    4 Claims

ABSTRACT OF THE DISCLOSURE

The invention relates to the novel compound 4-chloro-3-nitro-5-sulfamyl salicylic acid - (2',6' - dimethyl)-anilide and its salts, which have favorable diuretic activity and have been found to be free from undesired side effects, are of good tolerance and distinguished from known compounds of this type by increased diuretic effects.

---

The novel compound has a melting point of 265° C. and can be prepared by condensation of 4-chloro-3-nitro-5-sulfamyl salicylic acid with 2,6-dimethylaniline.

This invention relates to a novel, therapeutically valuable sulfamyl salicylic acid amide and salts thereof, which are especially efficient diuretics and are distinguished by improved therapeutic activity. The invention also relates to a process for preparing this compound and its salts.

It has been known to use as diuretics compounds e.g. 6-chloro-7-sulfamyl-1,2,4-benzothia-diazin - 1,1-dioxide or 6-chloro - 7 - sulfamyl - 3,4-dihydro - 1,2,4-benzothiadiazin-1,1-dioxide. However these compounds are not completely free from undesired side effects.

3-sulfamide-benzoic acid amides have also been known and suggested for being used as diuretically active compounds (German Auslegeschrift 1,138,032).

The main object of this invention is the preparation of novel compounds which are diuretically and saluretically active and—in addition to a satisfactory diuretic activity —are free from undesired side effects and distinguished by high tolerance.

It has now been found that a novel 5-sulfamyl-salicylic acid amide, i.e. the 4-chloro-3-nitro-5-sulfamyl-salicylic acid-(2',6'-dimethyl)anilide corresponding to the structural formula

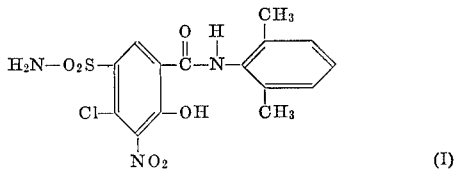

(I)

in the form of the free base or in form of its salts, is free from undesired side effects, is of good tolerance and distinguished from the known compounds of this type by a particularly good diuretic and saluretic effect.

The novel 4 - chloro-3-nitro-5-sulfamyl - salicylic acid-(2',6'-dimethyl)-anilide corresponding to the Formula I according to the invention, has been found in animal tests to be distinctly superior with regard to its diuretic and saluretic effect to the known orally applicable 6-chloro-7-sulfamyl - 3,4 - dihydro - 1,2,4 - benzothiadiazine - 1,1-dioxide, as well as to the likewise diuretically active 3-sulfamide-4-chloro-benzoic acid-(2',6' - dimethyl)-anilide (compound VIII, col. 7 of the Deutsche Auslegeschrift 1,138,032), which is of similar constitution.

Tests carried out with rats according to the method of Lipschitz, Hadidian and Kerpezar (J. Pharmacol. 79, 97–110 [1943]) have shown that upon peroral administration of 100 mg. of the novel substance according to this invention, a higher amount of urine is separated than upon use of 6-chloro-7-sulfamyl-3,4-dihydro-1,2,4-benzothiadiazin-1,1-dioxide on the one hand, and of 3-sulfamide-chloro-benzoic acid-(2',6'-dimethyl)-anilide, on the other hand.

Upon peroral administration of 100 mg. substance in each case the following amounts of separated urine were observed:

|  | Ml./kg. |
|---|---|
| 4-chloro-3-nitro-5-sulfamyl-salicylic acid-(2',6'-dimethyl)-anilide | 50.5 |
| 3-sulfamide-4-chloro-benzoic acid-(2',6'-dimethyl) anilide | 38.7 |
| 6-chloro-7-sulfamyl-3,4-dihydro-1,2,4-benzothiadiazine-1,1-dioxide | 20.5 |

The above data show that in the use of the new compound 4-chloro - 3 - nitro - 5 - sulfamylsalicylic acid-(2',6'-dimethyl)-anilide, relative to the comparison substance 3 - sulfamide - 4 - chloro-benzoic acid-(2',6'dimethyl)-anilide an increase of the diuresis of about 30%; relative to the known compound 6-chloro-7-sulfamyl-3,4-dihydro-1,2,4-benzothiadiazine-1,1-dioxide an increase of diuresis of even about 145% can be attained. These results show clearly the superiority of the compound embodying this invention over the comparison substances. This result is the more surprising as the 4-chloro-3-nitro-5-sulfamylsalicylic acid shows no effect in the diuresis test.

The 4 - chloro - 3 - nitro - 5 - sulfamylsalicylic acid-(2',6'-dimethyl)-anilide can be used as such, but also in the form of its salts, if desired in mixture with suitable solid or liquid carrier substances of conventional type, in obtaining pharmaceutical preparations, such as tablets, pills, dragees, particularly for peroral administration.

The novel 4 - chloro - 3 - nitro - 5 - sulfamylsalicylic acid-(2',6'-dimethyl)-anilide corresponding to the formula I can be prepared by reacting 4-chloro-3-nitro-5-sulfamyl-salicylic acid of the formula

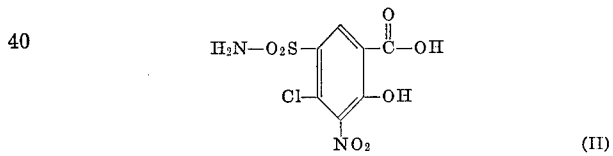

(II)

in a manner known per se with 2,6-dimethylaniline in the presence of an agent for splitting off of water, and—if desired—in the presence of an inert solvent. The condensation products thus formed may be converted with bases into their salts, if desired.

As examples of agents for splitting off of water—which are preferably used in a proportion of ⅓ to ½ mol for one mol of the 4-chloro-3-nitro-5-sulfamyl salicylic acid—inorganic acid halides are used, preferably phosphorus trichloride which gives a particularly high yield. Favorable results may be likewise obtained in the use of phosphorus pentachloride or phosphorus oxychloride.

According to an embodiment of the invention, the reaction between 4-chloro-3-nitro-5-sulfamyl-salicylic acid of the Formula II and 2,6-dimethyl-aniline in the presence of an agent for splitting off of water, is carried out by heating the reaction mixture in an inert organic solvent for several hours, heating being carried out preferably to the reflux temperature of the organic solvent. Thereby preferably a mol-ratio of 1:1 of the reactants is used.

In this embodiment, the reaction time amounts to about 3–6 hours and the reaction is carried out advantageously at a temperature of 130–150° C.

As inert organic solvents used in carrying out said reaction, polar solvents, e.g. chlorobenzene, as well as non-polar organic solvents, such as toluene, may be used. Good results are obtained also in the use of dichlorobenzene, xylene or nitrobenzene. It has been found that chlorobenzene is particularly suitable. Mixtures of two or several solvents may also be used.

The solvent or solvent mixture is preferably used in such amount that the reactants are completely dissolved at the high reaction temperature applied.

According to a further embodiment of the invention, the reaction of 4-chloro-3-nitro-5-sulfamyl salicylic acid of Formula II with 2,6-dimethylaniline can be carried out in the presence of an agent for splitting off of water also with an excess of 2,6-dimethylaniline, which serves simultaneously as the solvent. Thereby, the reaction mixture—which may contain up to about 11 mols of the aromatic amine for 1 mol of the acid (i.e. an excess of about 10 mols of 2,6-dimethylaniline)—is heated advantageously for several hours, e.g. 3 to 5 hours, in an oil bath to an elevated temperature, preferably a temperature of about 130 to 150° C.

The reaction product can be worked up in conventional manner without difficulty. For example, the reaction product obtained in the form of a precipitate, is separated from the reaction solution and is then dissolved in dilute aqueous ammonia-solution. The resulting solution is filtered and the desired end product is precipitated by addition of acid and subsequently purified by recrystallization.

The novel 4-chloro-3-nitro-5-sulfamyl salicylic acid-(2',6'-dimethyl)-anilide can be converted into salts in a manner known per se, for example by dissolving said compound in an aqueous or alcoholic solution of ammonia, or of an alkalimetal hydroxide; evaporation of the solvent under vacuum, whereby the ammonium salt or an alkali salt is formed.

The 4-chloro-3-nitro-5-sulfamyl salicylic acid of the Formula II, used as starting material in carrying out the process of the invention, can be prepared according to known methods, e.g. (a) by nitration of 4-chloro-5-sulfamyl-salicylic acid; or (b) sulfo-chlorination of a 4-chlorosalicylic acid compound substituted in the 3-position by a nitro-group and subsequent conversion of the resulting sulfochloride into the corresponding sulfonamide by reaction with ammonia; or (c) from 4-chloro-5-chlorosulfonylsalicycle acid by nitration and further reaction with ammonia of the resulting 4-chloro-5-chlorosulfonyl-salicylic acid substituted in the 3-position, to form the 4-chloro-3-nitro-5-sulfamylsalicylic acid.

The following Example describes by way of example and without limitation the preparation of 4-chloro-3-nitro-5-sulfamyl-salicylic acid-(2',6'-dimethyl)-anilide.

EXAMPLE

To 24 g. of dimethylaniline at room temperature 1 mil. phosphorus trichloride is added, stirred for 15 minutes, and to the resulting mixture 5.9 g. of 4-chloro-3-nitro-5-sulfamyl-salicylic acid are added. Subsequently, the reaction mixture is heated to about 140° C. for 3 hours. Thereby a solution is formed, which—after cooling down—is rendered distinctly alkaline by the addition of 2 n-sodium hydroxide solution. From the solution the excess of 2,6-dimethylaniline is removed by shaking with methylene chloride, and the solution is then acidified again. The precipitate formed thereby is sucked off, washed and is recrystallized from a mixture of methanol with water. The compound thus obtained is the 4-chloro-3-nitro-5-sulfamyl salicylic acid-(2',6'-dimethyl)-anilide having a melting point of 265° C. The yield amounts to 41% of the theory.

In order to prepare the potassium salt, 4 g. of 4-chloro-3-nitro-5-sulfamyl salicylic acid-(2',6'-dimethyl)-anilide are dissolved in 80 ml. of methanol and added under stirring to a warm solution 1.12 g. of KOH in 20 ml. of methanol. The resulting solution is concentrated under vacuum. The residue thus obtained is the potassium salt of the 4-chloro-3-nitro-5-sulfamyl-salicylic acid-(2',6'-dimethyl)-anilide. It is dried and can be used without further purification.

Instead of the potassium salt, the corresponding ammonium salt can be obtained in an entirely analogous manner by using instead of KOH an equivalent amount of ammonium hydroxide.

It will be understood from the above that this invention is not limited to the data, conditions and other details specifically described above and can be carried out with various modifications.

Thus, in preparing the compound embodying this invention, the mol ratio of the 4-chloro-3-nitro-5-sulfamyl salicylic acid of the Formula II to the 2,6-dimethylaniline may be varied from 1:1 to 1:10. The novel compound embodying the invention may be recrystallized from an organic solvent, e.g. methanol, or from a mixture of 2 volumes methanol and 1 volume water. In the above Example the phosphorus trichloride may be added to the dimethylaniline, e.g. at a temperature of 18–20° C. Drying of the novel compounds is carried out preferably at 80° to 120° C.

The novel compounds are applied preferably by oral administration and the daily dose of the free base and of its salt to a human patient of the weight of 70 kg., amounts to 20 to 120 mg. The diuretic activity of the novel compound of the invention in the form of therapeutically applicable salts is about equal to that of the free base.

What is claimed is:

1. A compound selected from the group consisting of 4-chloro-3-nitro-5-sulfamyl salicylic acid-(2',6'-dimethyl)-anilide and the alkali metal and ammonium salts thereof.

2. 4-chloro-3-nitro-5-sulfamyl salicylic acid-(2',6'-dimethyl)-anilide.

3. The potassium salt of 4-chloro-3-nitro-5-sulfamyl salicylic acid-(2',6'-dimethyl)-anilide.

4. The ammonium salt of 4-chloro-3-nitro-5-sulfamyl salicylic acid-(2',6'-dimethyl)-anilide.

References Cited

UNITED STATES PATENTS 2,910,488  10/1959  Novello _____ 260—556B

OTHER REFERENCES

Chemical Abstracts, vol 67: 21706h, Beirsdorf, July 1967.

Synthetic Organic Chemistry, Wagner et al., p. 567, 1953, John Wiley & Sons, Inc.

HENRY R. JILES, Primary Examiner

S. D. WINTERS, Assistant Examiner

U.S. Cl. X.R.

424—321; 260—521